United States Patent [19]
Ishihara

[11] Patent Number: 5,262,969
[45] Date of Patent: Nov. 16, 1993

[54] ARRANGEMENT AND METHOD OF ASCERTAINING DATA WORD NUMBER OF MAXIMUM OR MINIMUM IN A PLURALITY OF DATA WORDS

[75] Inventor: Shingo Ishihara, Yamanashi, Japan
[73] Assignee: NEC Corporation, Tokyo, Japan
[21] Appl. No.: 889,895
[22] Filed: May 29, 1992
[30] Foreign Application Priority Data
  May 29, 1991 [JP] Japan .................................. 3-154032
[51] Int. Cl.⁵ ........................... G06F 7/00; G06F 7/02
[52] U.S. Cl. ............................. 364/715.06; 340/146.2
[58] Field of Search .......................... 364/715.06, 769; 340/146.2

[56] References Cited
U.S. PATENT DOCUMENTS
  5,122,979 6/1992 Culverhouse .................. 364/715.06

OTHER PUBLICATIONS
Gourlay et al, "Circuit for finding the minimum or maximum of a set of binary numbers", IBM Tech. Disl. Bull. vol. 25 No. 7A Dec. 1982 pp. 3318-3320.

Primary Examiner—Tan V. Mai
Attorney, Agent, or Firm—Foley & Lardner

[57] ABSTRACT

The data words in a list are grouped into n groups. The grouping is performed by selecting the first code word of the list and every nth code word thereafter to form a first group, and then by selecting the next code word of the list and every nth code word thereafter to form a second group and repeating this selection process until n groups are formed. The maximum/minimum among the data words of each of the n groups is determined, and a data word number of the maximum/minimum is ascertained. Subsequently, an absolute data word number of the maximum/minimum of each of said n groups is determined using the data word number obtained and the group number and n. Finally, the absolute code word is determined by ascertaining the maximum/minimum in the list by comparing the n maximums/minimums of the n groups.

14 Claims, 7 Drawing Sheets

ARRANGEMENT AND METHOD OF ASCERTAINING DATA WORD NUMBER OF MAXIMUM OR MINIMUM IN A PLURALITY OF DATA WORDS

BACKGROUND OF THE INVENTION

1. Field of the Invention

The present invention relates generally to a method and arrangement of ascertaining the maximum or minimum among a plurality of data words which are sequentially arranged in a list, and the data word number thereof, and more specifically to such an arrangement and method which especially features the rapid determination of the data word number which is the maximum or minimum in the list. Merely for the convenience of description, the term "data word" in the instant disclosure, may imply a piece of data itself as well as a value thereof.

2. Description of the Prior Art

In order to determine the maximum or minimum among data words which are sequentially arranged in a list within a suitable memory, it is well known in the art to compare data words on a one by one basis. If the maximum value among the data words in the list needs to be determined, the first two data words are obtained from the memory and then compared, and the higher valued one is retained together with the data word number thereof and the other is discarded. The retained data word is then compared with the third data word, and the higher valued one is retained with the data word number thereof. Thus, the maximum data word is eventually specified together with the data word number, after all the data words have been compared one by one.

However, this technique suffers from the drawback that it is very slow in the event that the list includes a large number of data words.

SUMMARY OF THE INVENTION

It is an object of the present invention to provide an arrangement for rapidly determining the maximum or minimum value among a plurality of data words sequentially arranged in a list.

Another object of the present invention is to provide a method of rapidly determining the maximum or minimum value among a plurality of data words sequentially arranged in a list.

Another object of the present invention is to provide an arrangement for rapidly ascertaining the data word number of the maximum and minimum among a plurality of data words sequentially arranged in a list.

Still another object of the present invention is to provide a method of rapidly ascertaining the data word number of the maximum and minimum among a plurality of data words sequentially arranged in a list.

In brief, the above objects are achieved by a technique wherein the data words in a list are grouped into n groups. The grouping is performed by selecting the first code word of the list and every nth code word thereafter to form a first group, and then by selecting the next code word of the list and every nth code word thereafter to form a second group and repeating this selection process until n groups are formed. The maximum/minimum among the data words of each of the n groups is determined, and a data word number of the maximum/minimum is ascertained. Subsequently, an absolute data word number of the maximum/minimum of each of the n groups is determined using the data word number obtained and the group number and n. Finally, the absolute code word is determined by ascertaining the maximum/minimum in the list by comparing the n maximums/minimums of the n groups.

A first aspect of the present invention is a method of determining an absolute code word number of the maximum/minimum among a plurality of first data words in a list, comprising the steps of: (a) grouping the list into n groups, each of which contains second data words selected from the list every n data words (wherein n is an integer equal to or more than two); (b) determining the maximum/minimum among the second data words of each of the n groups, and determining a data word number of the maximum/minimum among the second data words of each of the n groups; (c) determining an absolute data word number of the maximum/minimum among the second data words of each of the n groups, using the data word number obtained in step (b) and the group number and n; and (d) determining the absolute code word by ascertaining the maximum/minimum among the first data words by comparing the n maximums/minimums of the n groups.

Another aspect of the present invention is a method a method of determining an absolute code word number of the maximum/minimum among a plurality of first data words in a list, comprising the steps of: (a) grouping the list into n groups, each of which contains second data words selected from the list every n data words (wherein n is an integer equal to or more than two); (b) determining the maximum/minimum among the second data words of each of the n groups, and determining a data word number of the maximum/minimum among the second data words of each of the n groups; (c) determining an absolute data word number of the maximum/minimum among the second data words of each of the n groups, by combining the data word number obtained in step (b) and the group number; and (d) determining the absolute code word by ascertaining the maximum/minimum among the first data words by comparing the n maximums/minimums of the n groups.

Still another aspect of the present invention is a method of determining an absolute code word number of the maximum/minimum among a plurality of first data words in a list, comprising the steps of: (a) grouping the list into n groups, each of which contains second data words selected from the list every n data words (wherein n is an integer equal to or more than two); (b) determining the maximum/minimum among the second data words of each of the n groups by sequentially comparing the second data words one by one, and determining an absolute data word number of the maximum/minimum among the second data words of each of the n groups by incrementing the second data word number by n or a multiple of n in response to the comparison result; and (c) determining the absolute code word by ascertaining the maximum/minimum among the first data words by comparing the n maximums/minimums of the n groups.

BRIEF DESCRIPTION OF THE DRAWINGS

The features and advantages of the present invention will become more clearly appreciated from the following description, taken in conjunction with the accompanying drawings, in which like elements are denoted by like reference numerals and in which.

DETAILED DESCRIPTION OF THE PREFERRED EMBODIMENTS

A first embodiment of the present invention will be discussed with reference to FIGS. 1 to 5.

Figure 1:
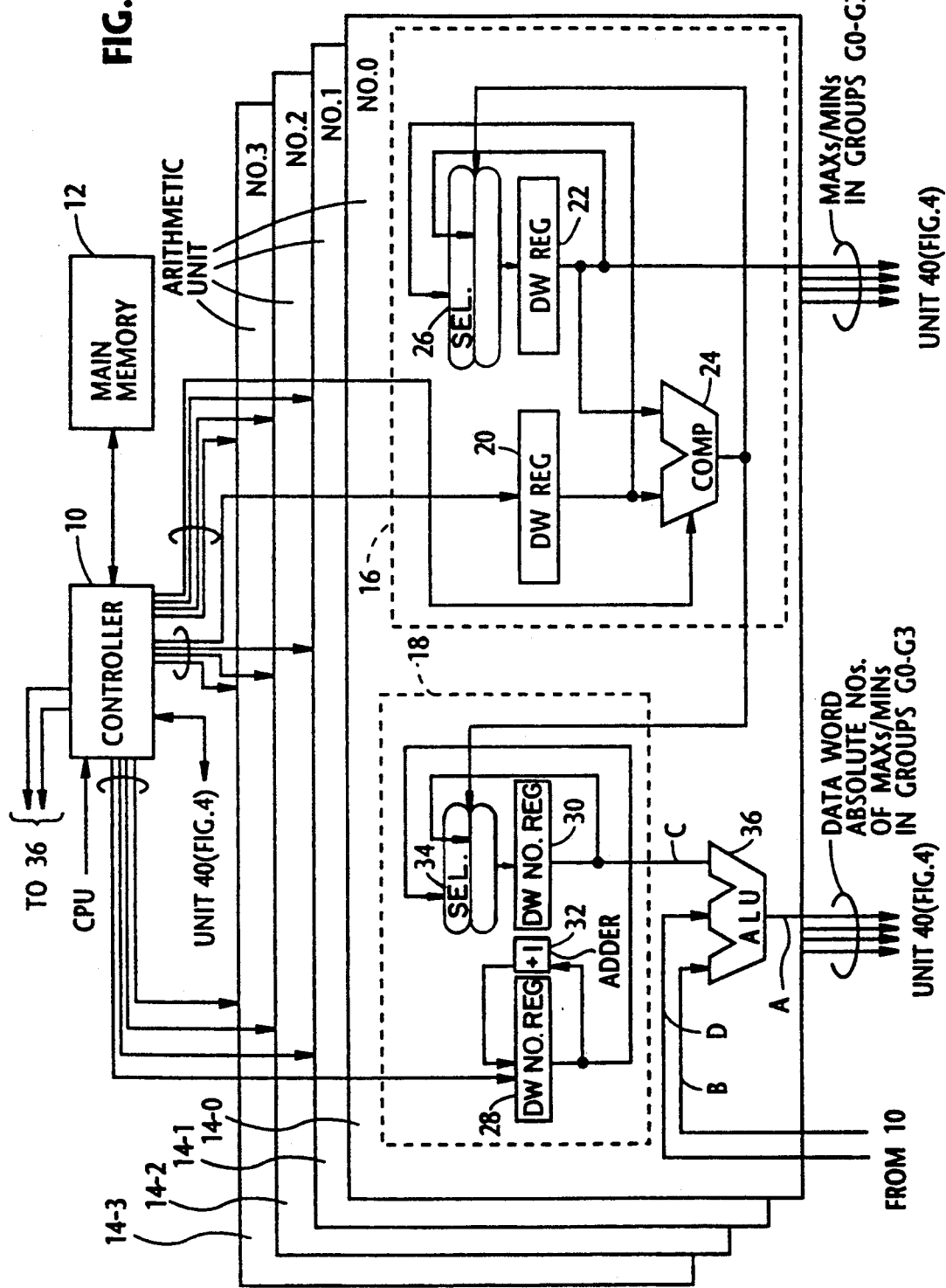
FIG. 1 is a block diagram showing a first embodiment of the present invention.

In FIG. 1, a controller 10 is operatively coupled to a CPU (central processing unit)(not shown) and supervised thereby. A main memory 12 and a plurality of arithmetic units 14-0, 14-1, 14-2 and 14-3 (viz., No. 0 to No. 3 arithmetic units) are coupled with the controller 10 in the illustrated manner. The number of arithmetic units is not limited to that shown in FIG. 1.

Figure 2:
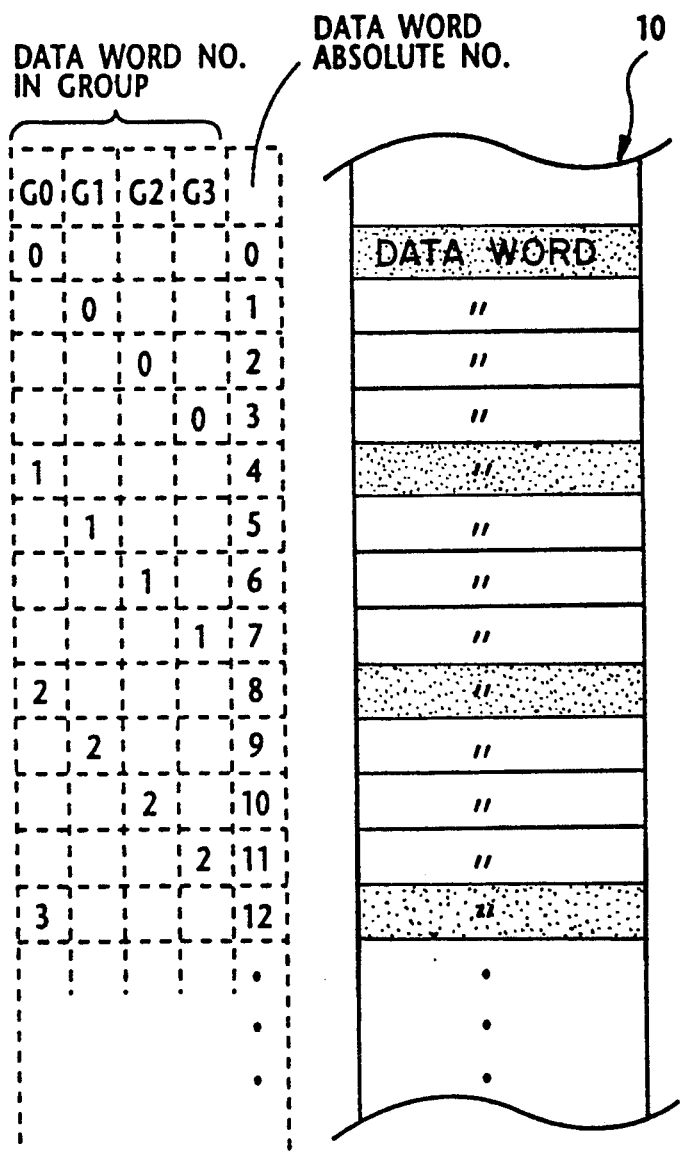
FIG. 2 is a diagram depicting a list of data words and the manner in which they are grouped in accordance with the instant invention.

FIG. 2 is a diagram schematically illustrating part of a plurality of data words in a list stored in the main memory 12. In FIG. 2, the data words in the list are sequentially numbered 0, 1, 2, 3, ... which are referred to as "data word absolute numbers" or merely "absolute numbers" in the instant disclosure. The data words in the list are classified into four groups G0, G1, G2 and G3 in a manner wherein each of the data words of each of the groups G0-G3 is selected from every fourth data word as best shown in FIG. 2. The number of each of the groups G0-G3 corresponds to that of the arithmetic units 14-0 to 14-3 (viz., No. 0 to No. 3 units). The data words in the groups G0-G3 undergo, respectively, maximum/minimum determination operations in the arithmetic units 14-0, 14-1, 14-2 and 14-3. Each of the data word numbers in the groups G0-G3 may be termed "group data number" in the instant disclosure.

Returning to FIG. 1, there is shown in detail, the arrangement of the arithmetic unit 14-0 which is assigned to implement data word comparison in connection with the group G0. It generally includes a group data comparator 17 and a group data number determiner 18. The group data comparator 16 determines the maximum/minimum of the data words in the group G0, and, includes two data word registers (each depicted by DW REG) 20, 22, a comparator 24 and a selector 34 (depicted by SEL). On the other hand, the group number determiner 18 produces the data word number of the maximum or minimum of the data words in the group G0, and includes two data word number registers (each depicted by DW NO. REG) 28, 30, an adder 32 and a selector 34 (depicted by SEL).

Each of the other arithmetic units 14-1 to 14-3 is configured in exactly the same manner as the unit 14-0.

Figure 3:
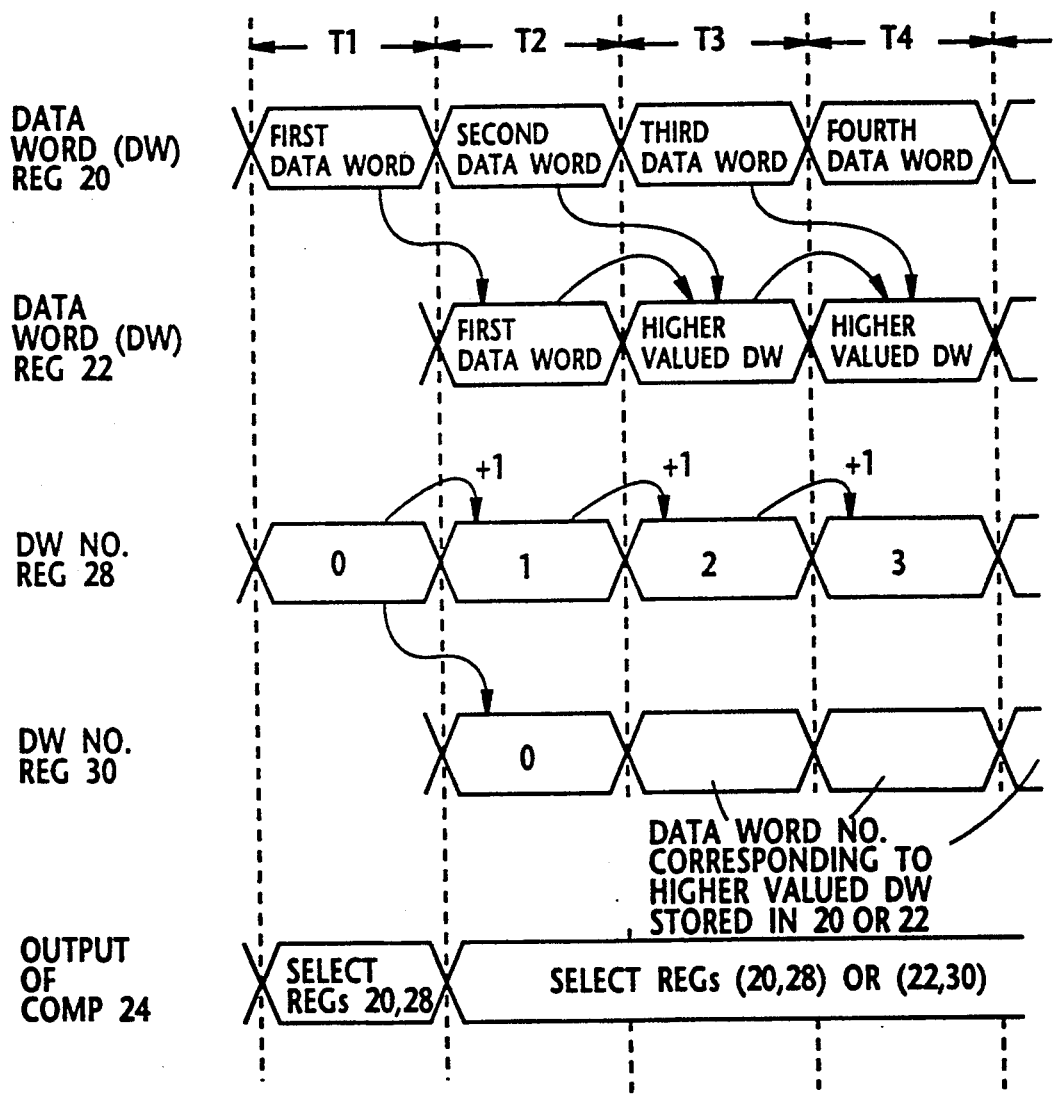
FIG. 3 is a timing chart which depicts the operation of an arithmetic unit which forms part of the first embodiment.

The operations of the FIG. 1 arrangement (viz., the arithmetic unit 14-0) will be described with reference to a timing chart shown in FIG. 3. It is assumed that the maximum among the data words in the group G0 and the group data number thereof are to be determined. It should be noted that the minimum in the group G0 and the data number thereof are determined in the same manner.

During the initial operation cycle T1, the controller 10 supplies the register 20 with the first data word of the group G0, while setting the group first data word number "0" in the register 28. Further, in the cycle T1, the controller 10 instructs the comparator 24 to output a signal which indicates the selection of the registers 20, 28.

Within the second cycle T2, the selectors 26, 34 respectively select the contents of the registers 20, 28 in response to the output of the comparator 24. Thus, the contents of the registers 22, 30 are respectively the first data word and the group data word number "0". In the same cycle T2, the comparator 24 determines via comparison, if either of the data words stored in the registers 20, 22 is larger than the other, and outputs a signal indicative of the comparison result (viz., indicating which register combinations 20-28 or 22-30 should be selected in the next operation cycle). In the event that the data values stored in the registers 20, 22 are equal with each other, then the comparator 24 outputs a signal which induces the selection of a data word having a larger group data word number in the following cycle T3.

Within each of the following cycles T3, T4, ..., the selector 26 selects either of the registers 20, 22 in response to the output of the comparator 24. In the event that the selector 26 selects the register 20, then the selector 34 selects the register 28. Similarly, if the selector 26 selects the register 22, the selector 34 selects the register 30.

Upon completion of the comparison of all of the data words in the group G0, the register 22 retains the maximum of the data words in the group G0, while the register 30 retains the corresponding group code word number. At the time the arithmetic unit 14-0 completes the comparison operations, the other arithmetic units 14-1 to 14-3 also contain respectively the maximum values of the data words of the groups G1 to G3 and also the corresponding group data word numbers.

As shown in FIG. 1, there is provided an ALU (arithmetic logic unit) 36 which determines the data word absolute number of the maximum in the group G0. The ALU 36 receives three kinds of signals:

(1) the output of the register 30 (viz., the group data number of the maximum in the group G0);

(2) the number of the arithmetic units (4 in this case); and (3) the arithmetic unit No. (0 in this case) from the controller 10.

Following this, the ALU 36 determines the data word absolute number of the maximum in the group G0 (depicted by A) according to the following equation.

$$A = B + (C \cdot D)$$

where B depicts the arithmetic unit number (viz., the group number), C the group data number of the maximum applied from the register 30, and D the number of the arithmetic units (viz., the groups G0-G3).

Figure 4:
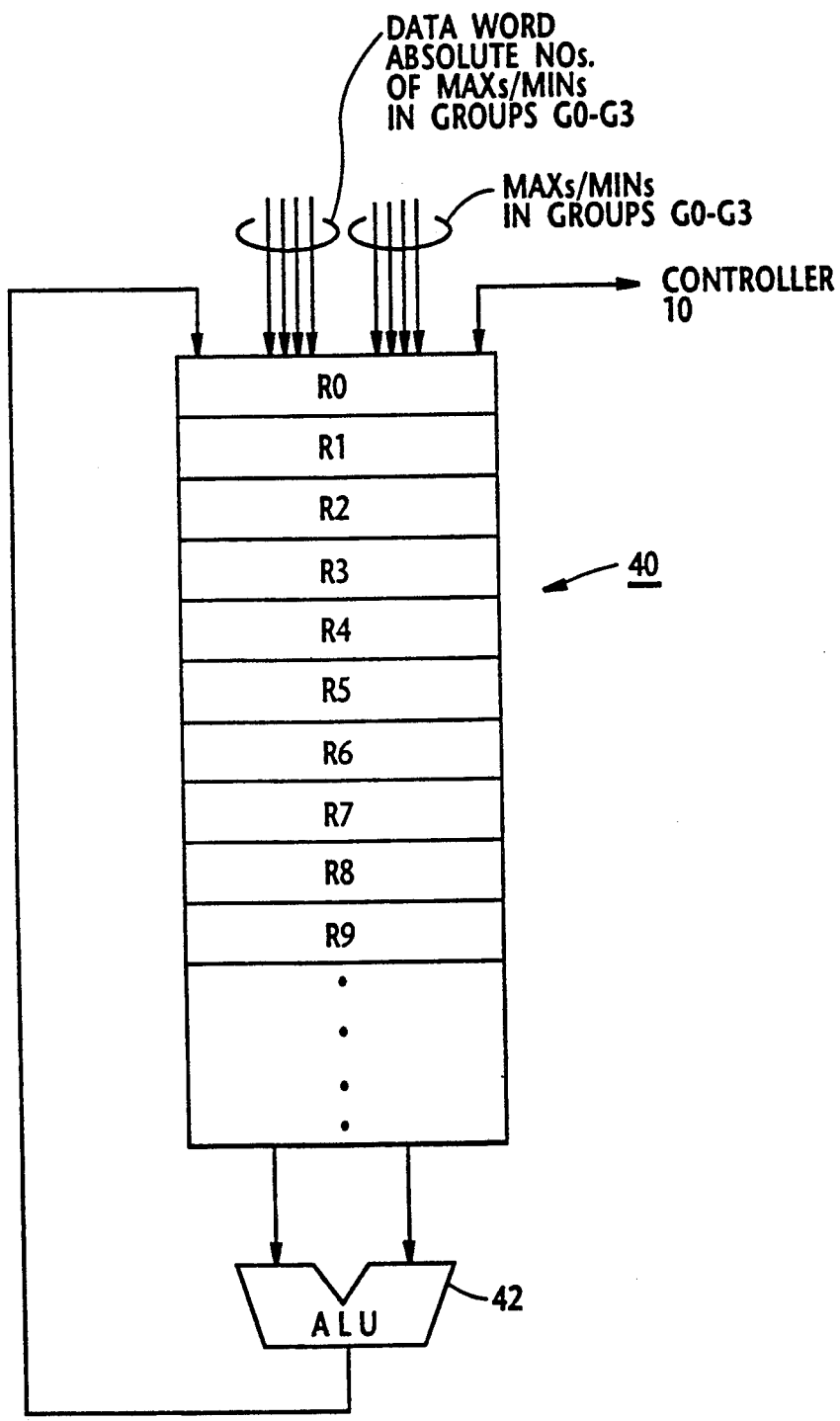
FIG. 4 is a block diagram schematically showing a unit which determines the maximum among the data words in the list and also the absolute value thereof.

The data word absolute number of the maximum in the group G0 thus derived, is stored in a unit 40 shown in FIG. 4. The data word absolute numbers of the maximums in the other groups G1-G3, are also stored in the unit 40 (FIG. 4). Similarly, the maximum values in the groups G0-G3 are stored in the unit 40 (FIG. 4).

FIG. 4 is a block diagram schematically showing the unit 40 which determines the maximum among the data words in the list and also the absolute value thereof.

As shown in FIG. 4, the unit 40 includes a plurality of registers R0-R9 and an ALU 42. The ten registers R0-R9 respectively store the following values:

R0: the maximum in group G0;
R1: the maximum in group G1;
R2: the maximum in group G2;
R3: the maximum in group G3;
R4: the data word absolute no. of the maximum in G0;
R5: the data word absolute no. of the maximum in G1;
R6: the data word absolute no. of the maximum in G2;
R7: the data word absolute no. of the maximum in G3;
R8: the maximum among all of the data words in the list; and
R9: the absolute number of the maximum stored in the register R8.

Figure 5:
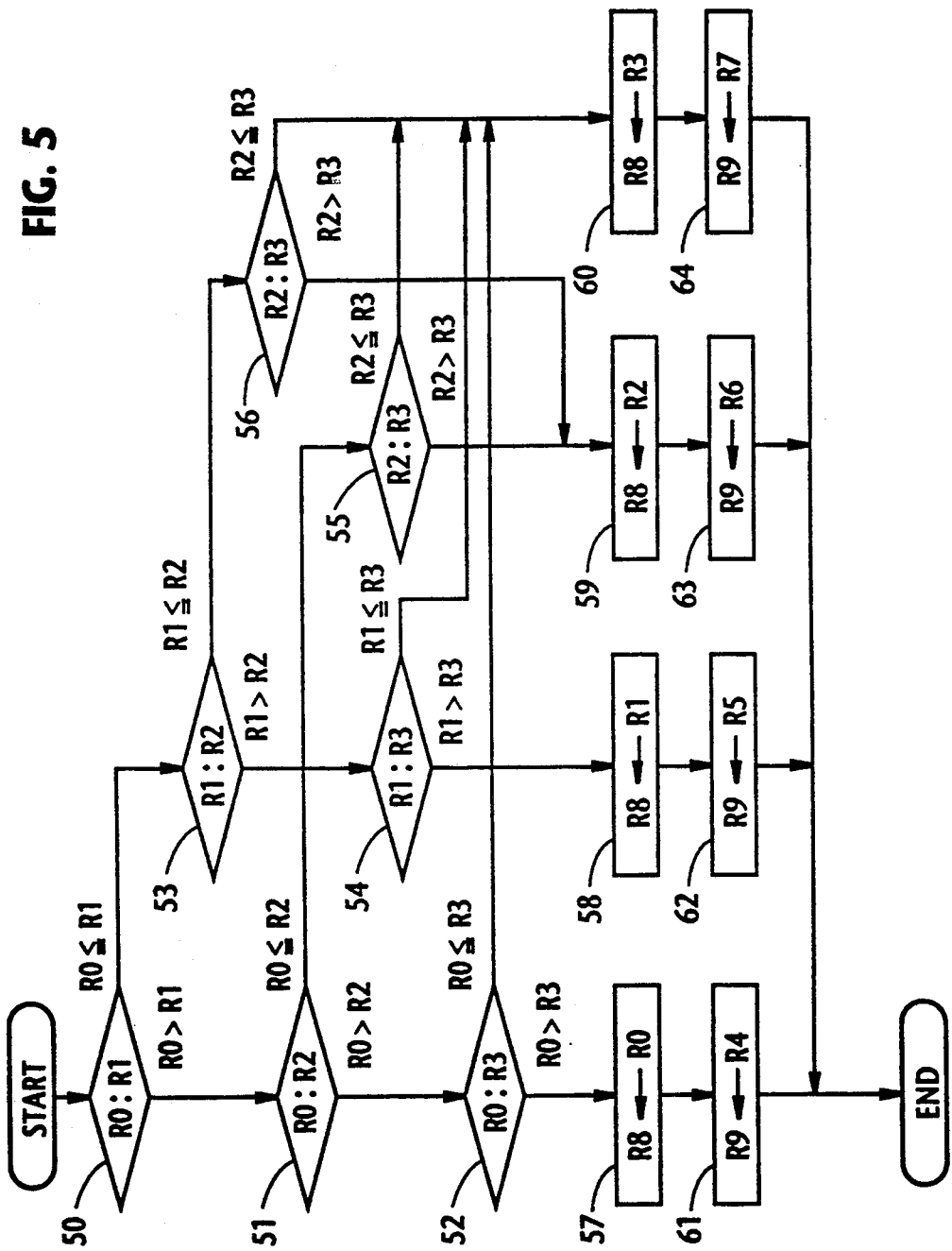
FIG. 5 is a flow chart showing the steps which characterized the operation of the first embodiment of the invention.

FIG. 5 is a flow chart which includes steps 50-64 wherein, for the sake of convenience, each of R0-R9 indicates the content of the corresponding register. The maximum value among all of data words in the list is determined through comparison steps 50-56 and then stored in the register R8 at one of steps 57-60. Subsequently, the code data absolute number, which corresponds to the maximum in the list detected, is stored in the register R9 at one of steps 61-64. These operations are implemented within the unit 40 shown in FIG. 4. The detailed description thereof is deemed redundant to those skilled in the art and will be omitted for the sake of brevity.

The contents of the registers R8, R9 are fed to the controller 10.

Figure 6:
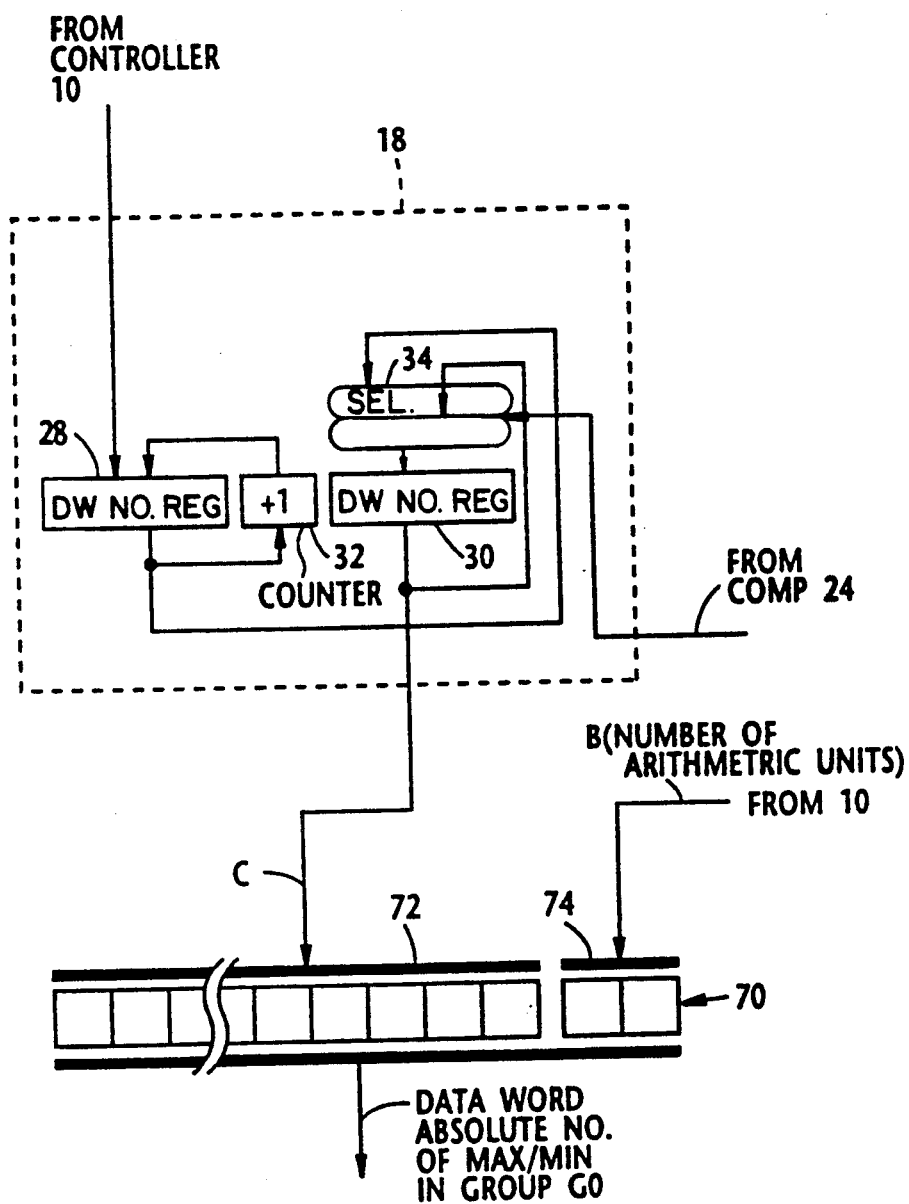
FIG. 6 is a block diagram showing the arrangement which characterizes a second embodiment of the present invention.

FIG. 6 is a block diagram showing a second embodiment of the present invention. The arrangement of FIG. 6 differs from that of FIG. 1 in that the former arrangement includes a register 70 in lieu of the ALU 36. The remaining portions of the FIG. 6 arrangement are identical with those of the FIG. 1 arrangement. It is assumed that the number of the arithmetic units is 4 as in the first embodiment. The register 70 includes upper and lower bit portions 72, 74 which respectively receive the output of the register 30 (viz., C) and the arithmetic unit no. (viz., B) from the controller 10. The bit length of the lower bit portion 74 (2 bits in this case) is determined by the number of the arithmetic units (viz., 14-0 to 14-3). On the other hand, the bit length of the upper bit portion 72 is determined so as to be able to accommodate the largest group data number.

In FIG. 6, it is assumed that the group data number applied from the register 30 is "000011" (viz., 3 in decimal) and the arithmetic unit number is "00". Then the output of the register 70 (the code word absolute number) is "00001100" (viz., 12 in decimal). Thus, the code word absolute number of the maximum (or minimum) in the group G0 is determined via the use of a very simple hardware arrangement. It goes without saying that each of the other arithmetic units 14-1 to 14-3 is provided with a register identical to the register 70.

The following operations for determining the maximum or minimum among all of the code words in the list have been discussed with reference to the first embodiment.

Figure 7:
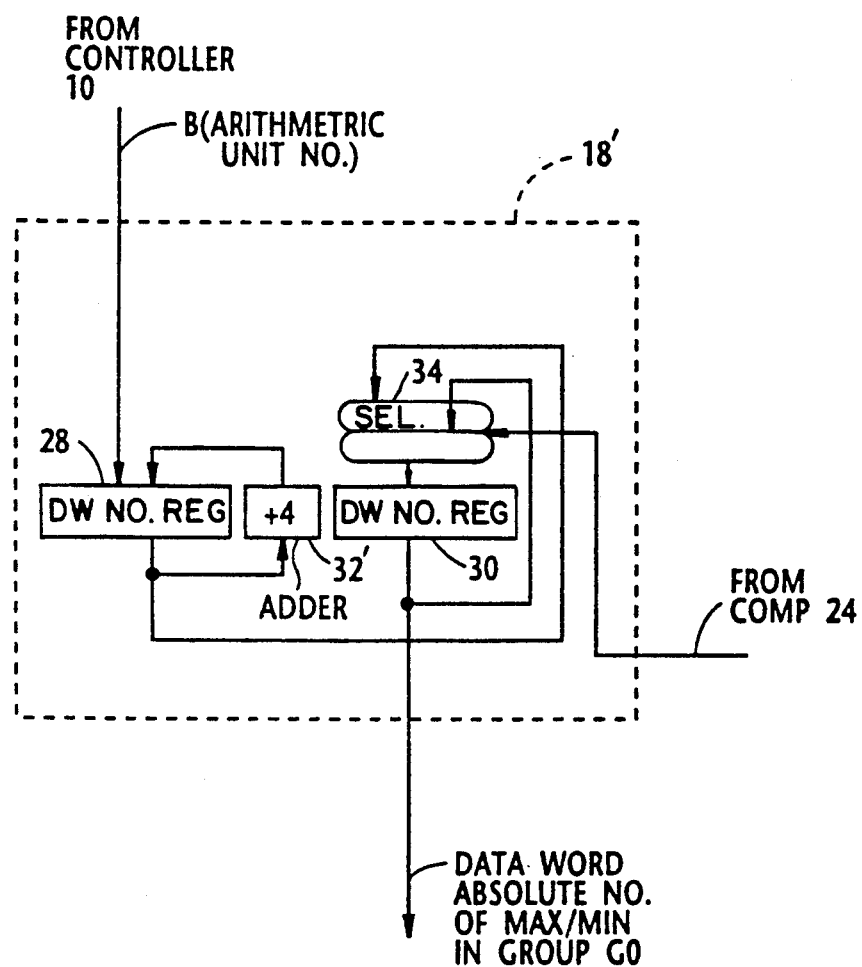
FIG. 7 is a block diagram showing the arrangement which characterizes a third embodiment of the invention.

FIG. 7 is a block diagram showing the circuit arrangement which characterizes the third embodiment of the present invention. The third embodiment is basically the same as the first embodiment and differs in that an adder 32' is arranged to add four to each output of the register 28 and feed back the sum to the register. The controller 10 sets an initial value of the arithmetic unit number or the group number (0 in this case). Accordingly, the ALU 36 of the first embodiment is rendered unnecessary in this instance, because the register 28 contains every fourth absolute number which is acquired into the register 30 in response to the selection signal applied from the comparator 24 (FIG. 1).

It will be understood that the above disclosure is representative of three possible embodiments of the present invention and that the concept on which the present invention is based is not specifically limitied thereto.

What is claimed is:

1. A method of generating a signal indicative of an absolute data word number of one of a maximum and minimum value among a plurality of first data words in a list, each of said first data words corresponding to a unique absolute data word number, said method comprising the steps of:
   a) storing said first data words and storing said corresponding absolute data word numbers in a data storage device;
   b) grouping said first data words into n groups each of which contains second data words, said grouping performed by selecting from said list every n first data words (wherein n is an integer equal to or more than two);
   c) generating signals representative of said n groups wherein each group contains said selected second data words and a group data word number corresponding to each of said selected second data words;
   d) supplying said signals of step c) for each group to one of n determination units;
   e) in each of said n determination units,
      i) determining, in response to said signals of step c), one of a maximum and minimum value among the selected second data words;
      ii) determining a corresponding group data word number of said determined one of said maximum and minimum value among the selected second data words;
      iii) determining an absolute data word number corresponding to said one of said maximum and minimum value using the group data word number obtained in step e-ii), the number of the group and n; and
      iv) generating signals representative of said determined one of said maximum and minimum value and said corresponding absolute data word number; and
   f) storing said generated signals of step e-iv) for each of said n determination units;
   g) utilizing said stored signals of step f), comparing said stored signals representative of said determined ones of said maximum and minimum values of said n groups to determine one of the maximum and minimum value among all of the n groups; and
   h) generating a signal representative of the absolute data word number corresponding to the determined one of said maximum and minimum values from step g).

2. The method as recited in claim 1 wherein step e-iii) comprises the step of utilizing the relationship:

$$A = B + (C*n)$$

where:
- A = the absolute data word number;
- B = the group number;
- C = the group data word number from step c); and
- n = the number of groups.

3. The method as recited in claim 2, wherein step b) comprises the steps of:
   i) selecting the first data word of the list and every nth data word thereafter to form a first group of said selected second data words;
   ii) selecting the next of said first data words of said list and every nth data word thereafter to form a next group of said selected second data words; and
   iii) repeating step ii) until n groups of said selected second data words are formed.

4. The method as recited in claim 1, wherein step b) comprises the steps of:
   i) selecting the first data word of the list and every nth data word thereafter to form a first group of said selected second data words;
   ii) selecting the next of said first data words of said list and every nth data word thereafter to form a next group of said selected second data words; and
   iii) repeating step ii) until n groups of said selected second data words are formed.

5. A method of generating a signal indicative of an absolute data word number of one of a maximum and minimum value among a plurality of first data words in a list, each of said first data words corresponding to a unique absolute data word number, said method comprising the steps of:
   a) storing said first data words and storing said corresponding absolute data word numbers in a data storage device;
   b) grouping said first data words into n groups each of which contains second data words, said grouping performed by selecting from said list every n first data words (wherein n is an integer equal to or more than two);
   c) generating signals representative of said n groups wherein each group contains said selected second data words and a group data word number corresponding to each of said selected second data words;
   d) supplying said signals of step c) for each group to one of n determination units;
   e) in each of said n determination units,
      i) determining, in response to said signals of step c), one of a maximum and minimum value among the selected second data words;
      ii) determining a corresponding group data word number of said determined one of said maximum and minimum value among the selected second data words;
      iii) determining an absolute data word number corresponding to said one of said maximum and minimum value using the group data word number obtained in step e-ii) and the number of the group; and
      iv) generating signals representative of said determined one of said maximum and minimum value and said corresponding absolute date word number; and
   f) storing said generated signals of step e-iv) for each of said n determination units;
   g) utilizing said stored signals of step f), comparing said stored signals representative of said determined ones of said maximum and minimum values of said n groups to determine one of the maximum and minimum value among all of the n groups; and
   h) generating a signal representative of the absolute data word number corresponding to the determined one of said one of said maximum and minimum values from step g).

6. The method as recited in claim 5, wherein step b) comprises the steps of:
   i) selecting the first data word of the list and every nth data word thereafter to form a first group of said selected second data words;
   ii) selecting the next of said first data words of said list and every nth data word thereafter to form a next group of said selected second data words; and
   iii) repeating step ii) until n groups of said selected second data words are formed.

7. A method of generating a signal indicative of an absolute data word number of one of a maximum and minimum value among a plurality of first data words in a list, each of said first data words corresponding to a unique absolute data word number, said method comprising the steps of:
   a) storing said first data words and storing said corresponding absolute data word numbers in a data storage device;
   b) grouping said first data words into n groups each of which contains second data words, said grouping performed by selecting from said list every n first data words (wherein n is an integer equal to or more than two);
   c) generating signals representative of said n groups wherein each group contains said selected second data word and a group data word number corresponding to each of said selected second data words;
   d) supplying said signals of step c) for each group to one of n determination units;
   e) in each of said n determination units,
      i) determining, in response to said signals of step c), one of a maximum and minimum value among the selected second data words by comparing the second data words one by one with each other, and, with each comparison, incrementing the corresponding group data word number by m*n, where m in a positive integer greater than or equal to one, said incremented group data word number being equal to said absolute data word number; and
      ii) generating signals representative of said determined one of said maximum and minimum value and said corresponding absolute date word number; and
   f) storing said generated signals of step e-ii) for each of said n determination units;
   g) utilizing said stored signals of step f), comparing said stored signals representative of said determined ones of said maximum and minimum values of said n groups to determined one of the maximum and minimum value among all of the n groups; and
   h) generating a signal representative of the absolute data word number corresponding to the determined one of said one of said maximum and minimum values from step g).

8. The method as recited in claim 7, wherein step b) comprises the steps of:

i) selecting the first data word of the list and every nth data word thereafter to form a first group of said selected second data words;

ii) selecting the next of said first data words of said list and every nth data word thereafter to form a next group of said selected second data words; and iii) repeating step ii) until n groups of said selected second data words are formed.

9. A method of generating a signal indicative of an absolute data word number of a maximum value among a plurality of first data words in a list, each of said first data words corresponding to a unique absolute data word number, said method comprising the steps of:

a) storing said first data words and storing said corresponding absolute data word numbers in a data storage device;

b) grouping said first data words into n groups each of which contains selected second data words, said grouping performed by selecting from said list every n first data words (wherein n is an integer equal to or more than two);

c) generating signals representative of said n groups wherein each group contains said selected second data words and a group data word number corresponding to each of said selected second data words;

d) supplying said signals of step c) for each group to one of n determination units;

e) in each of said n determination units, i) determining, in response to said signals of step c), a maximum value among the selected second data words;

ii) determining a corresponding group data word number of said determined maximum value among the selected second data words;

iii) determining an absolute data word number corresponding to said maximum value using the group data word number obtained in step e-ii), the number of the group and n; and iv) generating signals representative of said determined maximum value and said corresponding absolute date word number; and f) storing said generated signals of step e-iv) for each of said n determination units;

g) by utilizing said stored signals of step f), comparing said stored signals representative of said determined maximum values of said n groups to determine the maximum value among all of the n groups; and h) generating a signal from step g) as said signal representative of the absolute data word number corresponding to the determined maximum value.

10. A method of generating a signal indicative of an absolute data word number of a minimum value among a plurality of first data words in a list, each of said first data words corresponding to a unique absolute data word number, said method comprising the steps of:

a) storing said first data words and storing said corresponding absolute data word numbers in a data storage device;

b) grouping said first data words into n groups each of which contains selected second data words, said grouping performed by selecting from said list every n first data words (wherein n is an integer equal to or more than two);

c) generating signals representative of said n groups wherein each group contains said selected second data words and a group data word number corresponding to each of said selected second data words;

d) supplying said signals of step c) for each group to one of n determination units;

e) in each of said n determination units, i) determining, in response to said signals of step c), a minimum value among the selected second data words;

ii) determining a corresponding group data word number of said determined minimum value among the selected second data words;

iii) determining an absolute data word number corresponding to said minimum value using the group data word number obtained in step e-ii), the number of the group and n; and iv) generating signals representative of said determined minimum value and said corresponding absolute date word number; and f) storing said generated signals of step e-iv) for each of said n determination units;

g) by utilizing said stored signals of step f), comparing said stored signals representative of said determined minimum values of said n groups to determine the minimum value among all of the n groups; and h) generating a signal from step g) as said signal representative of the absolute data word number corresponding to the determined minimum value.

11. An apparatus for determining an absolute data word number of one of a maximum and minimum value among a plurality of first data words in a list, each of said first data words corresponding to a unique absolute data word number, said apparatus comprising:

(a) a memory storage device storing said list of first data words;

(b) a controller, connected to said memory storage device and receiving said list and generating a plurality of n groups of second data words, each group including a corresponding group data word number;

(c) a plurality of n arithmetic units connected respectively to receive said n groups of said second data words, each unit including:

(1) a group data word comparator including storage means for storing ones of said second data words for sequentially comparing said ones of said second data words to determine said one of a maximum and minimum value thereof, said comparator outputting an output signal representative of said determined one of said maximum and minimum value of said second data words of said group;

(2) a group data word number determiner including storage means for storing ones of said group data word numbers corresponding to said stored ones of said second data words, said group data word number determiner outputting a group data word number signal corresponding to said determined one of said maximum and minimum value; and (3) conversion means responsive to said group data word number signal for generating a word number output signal corresponding to the absolute data word number of said determined one of said maximum and minimum value; and (d) means responsive to the output signals of each of said comparators of said arithmetic units for selecting said one of said maximum and minimum value from among said n groups and for selecting the corresponding word number output signal for generating a signal indicative of the absolute value data word number corresponding to said determined one of said maximum and minimum value.

12. Apparatus as recited in claim 11, wherein said conversion means comprises arithmetic means for calculating the following relationship:

$$A = B + (C * n)$$

where:
- A = the absolute data word number;
- B = the group number;
- C = the group data word number; and
- n = the number of groups.

13. Apparatus as recited in claim 11, wherein said conversion means comprises means for incrementing the corresponding group data word number by m*n each time after said comparator sequentially compares said stored ones of said second data words, where m in a positive integer greater than or equal to one, said incremented group data word number being equal to said absolute data word number.

14. An apparatus as claimed in claim 11, wherein each of said n groups has a group number corresponding thereto and each of said n arithmetic units has an arithmetic number corresponding thereto, and said conversion means includes a register having an upper bit portion for storing the group data word number signal and a lower bit portion for storing the group number, said lower bit portion having a number of bits determined by said number n of arithmetic units, said register supplying output signals as said word number output signal.

* * * * *